Nov. 4, 1958 E. G. SPANGLER 2,859,015
APPARATUS FOR STORING, CONDITIONING AND DISPENSING FATS
Filed May 9, 1955 3 Sheets-Sheet 1
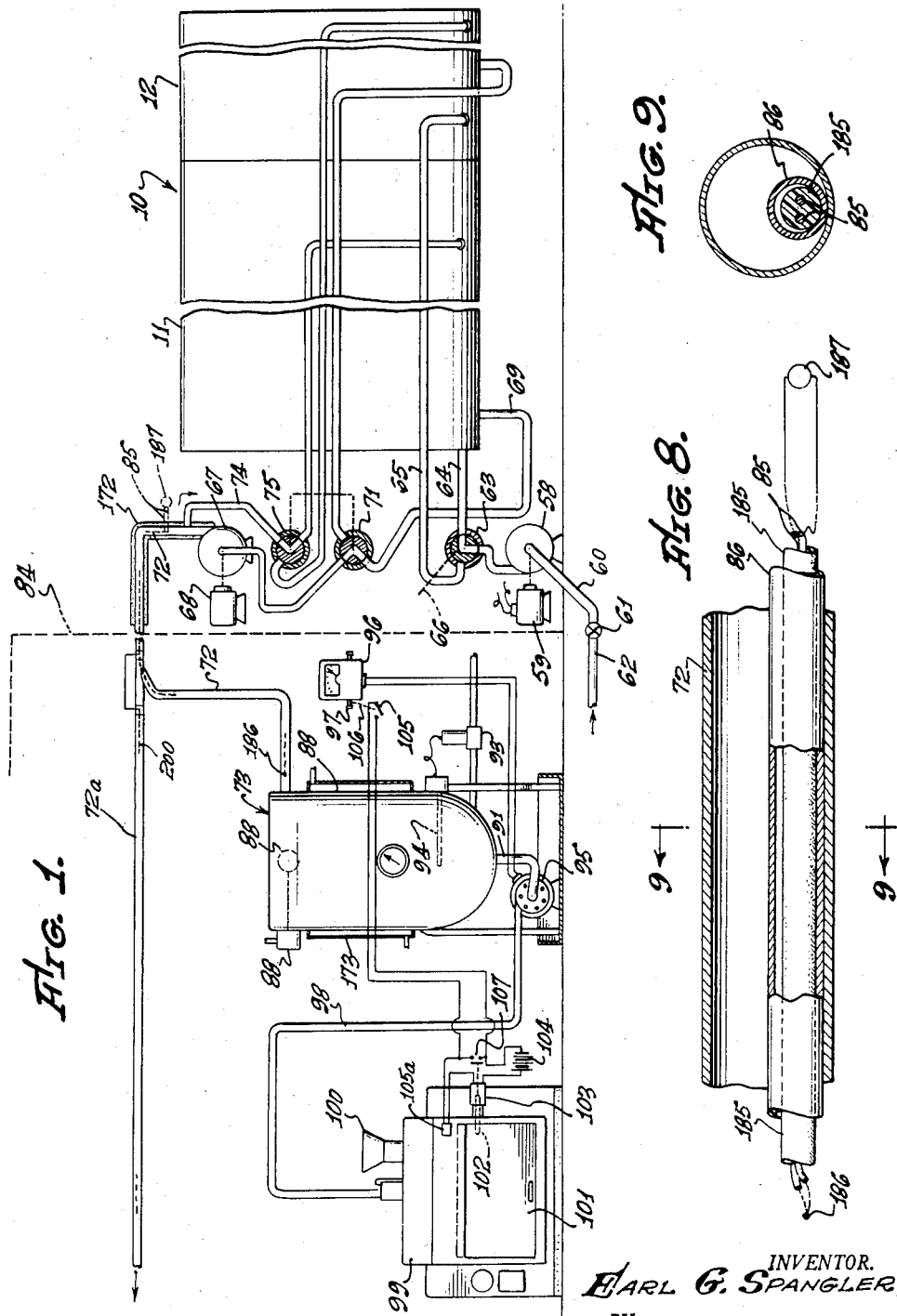
INVENTOR.
EARL G. SPANGLER,
BY
William P. Green
ATTORNEY.

Nov. 4, 1958 E. G. SPANGLER 2,859,015
APPARATUS FOR STORING, CONDITIONING AND DISPENSING FATS
Filed May 9, 1955 3 Sheets-Sheet 2
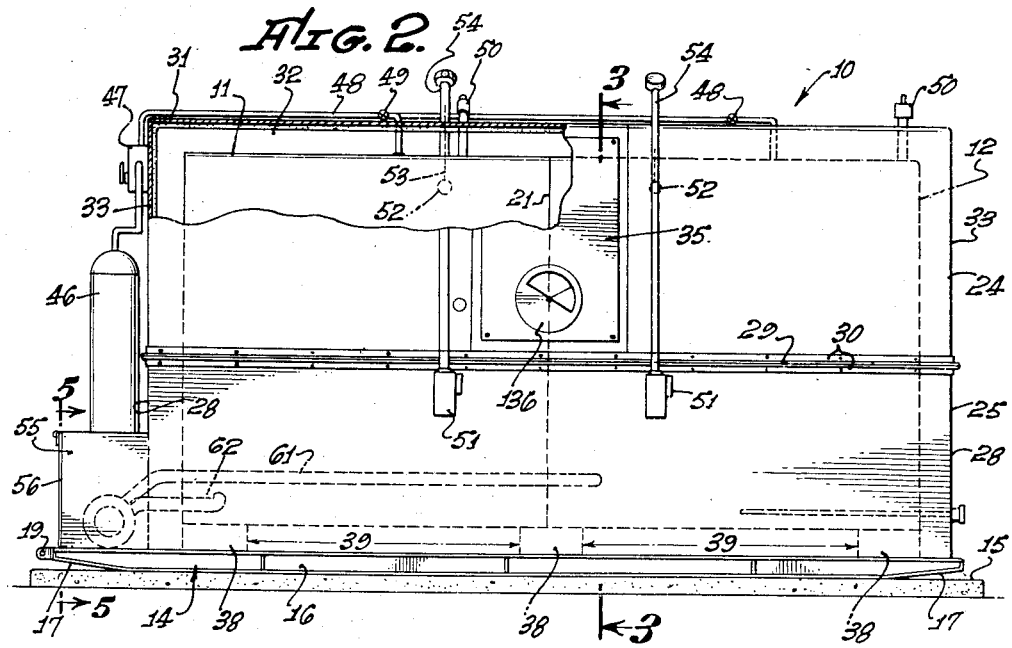
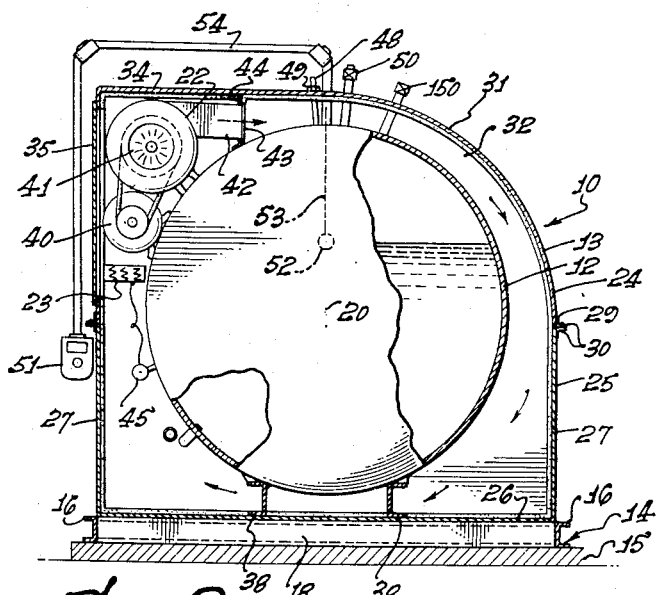
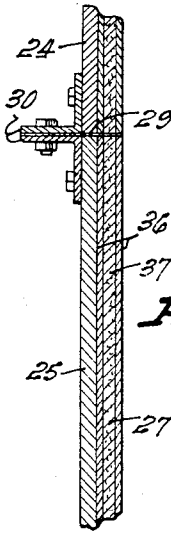
EARL G. SPANGLER,
INVENTOR.
BY William P. Green
ATTORNEY Nov. 4, 1958  E. G. SPANGLER  2,859,015
APPARATUS FOR STORING, CONDITIONING AND DISPENSING FATS
Filed May 9, 1955  3 Sheets-Sheet 3
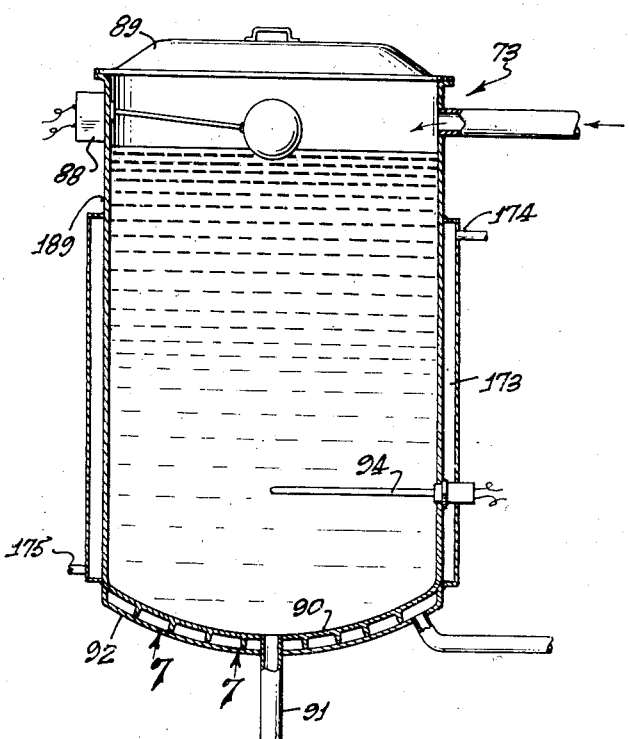
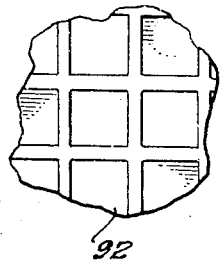
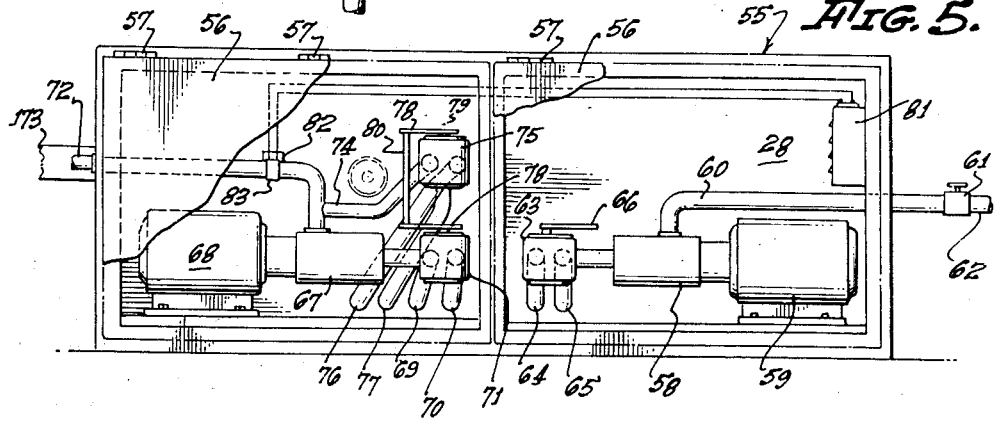
EARL G. SPANGLER,
INVENTOR.

United States Patent Office 2,859,015
Patented Nov. 4, 1958

2,859,015

APPARATUS FOR STORING, CONDITIONING, AND DISPENSING FATS

Earl G. Spangler, Los Angeles, Calif.

Application May 9, 1955, Serial No. 506,776

11 Claims. (Cl. 257—2)

This invention relates to improved apparatus for use in storing and handling fats. The present apparatus is usable for handling such animal and vegetable fats as lard, hydrogenated fats, tallow, soya oil, cottonseed oil, peanut oil, and the like, typically to be used as shortening in a bakery or for other industrial purposes.

In using shortening at a bakery, and in handling fats for other similar uses, it is usually desirable to maintain the supply of fats at a predetermined temperature, which is in most cases well above the ambient temperature. Heretofore, the storage systems utilized for this purpose have not been capable of accurately maintaining the temperature of such a large body of fats at an accurately controlled and uniform temperature, with the result that some of the fats in the supply tank might be well above the desired temperature, while the rest of the fats might be under the desired temperature and therefore might stratify or become too thick to flow with freedom.

A major object of the present invention is to provide an improved storage system which is capable of maintaining an entire supply of fats at a desired accurately controllable temperature, with the temperature being substantially uniform throughout the body of fats. For this purpose, I employ a storage tank which is contained within and spaced from an outer shell, to provide an air circulation space between the tank and shell. I then control the temperature of the fats in the tank by control of the air temperature in the outer space, and since this air space may extend entirely about the tank, the fat temperature can be maintained uniform throughout. Preferably, the air in the space is maintained in circulation as by a suitable fan, and is directed along an endless path about the tank.

For most satisfactory handling of fats, I prefer to utilize two such tanks within a common outer shell, the two tanks being adapted to be filled and emptied individually, so that one tank may be first completely emptied and thus cleaned of fats, following which the other tank at a proper temperature is immediately ready to take the place of the first in supplying fats for use. Such provision for complete discharge of a tank before refilling is extremely important for preventing contamination of incoming fats with a small amount of older fats already in the tank.

A further feature of the invention resides in an improved tempering tank to which the fats are fed from the above discussed storage tanks, and in which the temperature of the fats may be somewhat reduced. The fats may be fed into an upper portion of this tempering tank, and withdrawn at a reduced temperature from a lower end. Preferably, there is a heater near the bottom outlet, desirably comprising a hot water or stem jacket or electric heater at the underside of the tank, for preventing cooling of the fats at the outlet location beyond the desired reduced temperature (to assure fluidity at that location). In flowing to the tempering tank, the fats may pass through a conduit having a unique internal heater element positioned therein.

When used in a bakery, the present apparatus may include means for delivering a charge of the fats to a dough mixer, to be mixed with other ingredients. In this case, an additional feature of the invention has to do with an automatic control for preventing removal of the dough from the mixer unless the fat supplying apparatus has been actuated to add fats to the other ingredients.

The above and other features and objects of the present invention will be better understood from the following detailed description of the typical embodiment illustrated in the accompanying drawings in which:

Fig. 1 is a schematic representation of a system, embodying the invention, for storing and handling fats;

Fig. 2 is a side view, partially broken away, of the main storage unit of the Fig. 1 apparatus;

Fig. 3 is a transverse section taken essentially on line 3—3 of Fig. 2;

Fig. 4 is an enlarged fragmentary section through a portion of the side wall of the unit shown in Figs. 2 and 3;

Fig. 5 is an enlarged view taken on line 5—5 of Fig. 2;

Fig. 6 is an enlarged vertical section through the tempering tank of Fig. 1;

Fig. 7 is an enlarged fragmentary section taken on line 7—7 of Fig. 6;

Fig. 8 is an enlarged fragmentary section through the heated fluid delivery line of Fig. 1; and Fig. 9 is a transverse section taken on line 9—9 of Fig. 8.

Referring first to Figs. 2 to 5, and especially Figs. 2 and 3, I have shown at 10 in those figures a main storage unit for holding a supply of fats, which, in the particular installation which has been typically represented, may be intended for use as shortening in a bakery. This unit 10 includes two storage tanks 11 and 12, contained within and spaced from a common outer shell 13, and all mounted rigidly on a runner or skid structure 14 which may be moved to a position of use on a stationary base 15 typically formed of cement. The runner structure 14 may include two spaced parallel side runners 16, having undersurfaces with inclined end portions 17, with a number of transverse frame members 18 extending between runner members 16 at longitudinally spaced locations. The parts 16 and 18 are of course rigidly secured together, and the entire runner structure and carried parts may be pulled to the proper position of use on base 15 by means of a pulling tongue 19.

Tanks 11 and 12 may be of identical cylindrical configuration, and may be in end to end alinement and centered about a common horizontally extending axis 20. These tanks 11 and 12 are desirably formed of steel, preferably painted black or another dark color about its outer side to facilitate the absorption of heat into the tanks. The ends of the tanks are of course closed by transverse or vertical end walls, and at their adjacent ends the two tanks may have a common vertical end wall 21. The interior surfaces of all of the walls of tanks 11 and 12 may be coated with glass or vitreous enamel, to protect the fats contained in the tanks against direct contact with the metal of the walls.

The outer shell 13 of unit 10 is spaced from the walls of tanks 11 and 12 entirely about the tanks, to provide between the shell and tanks an air circulation space 122, within which a blower 22 continuously circulates air heated by heating coils 23. Shell 13 may include an upper section 24 and a lower section 25. The lower section is of rectangular box like structure, having a bottom wall 26, two parallel upwardly extending side walls 27, and two parallel vertical end walls 28, the latter being spaced from and parallel to the end walls of tanks 11 and 12. Lower section 25 of the shell is formed of temperature resistant fire box steel, and will hold enough fats to fill both of the tanks 11 and 12, without overflowing, to thus retain the entire contents of the tanks in the event of leakage of the tanks. The steel of the lower portion 25 of the shell is of course adapted to withstand the temperature at which the fats in tanks 11 and 12 are maintained. In order that lower section 25 of the shell may thus contain the fats in the event of leakage, section 25 is of course fluid-tight, and fluid-tight connections are formed whereever any of the later to be discussed lines or fittings connect into this lower section of the shell.

The lower section 25 of the shell terminates upwardly along a line 29, at which the upper section of the shell is connected to the lower section in any suitable manner, as by interconnected angle irons 30 which are desirably sealed by suitable gaskets. The upper section of the shell has a top wall 31, which is, along most of its length, of semi circular transverse configuration, to be spaced an essentially uniform distance 32 from the upper sides of tanks 11 and 12. At its ends, upper section 24 has a pair of end walls 33, which form upper semi circular vertically extending continuations of end walls 28 of the lower section of the shell. The blower 22 and heater 23 may be housed within an enlarged portion 34 of the top section 24 of the shell, which portion 34 is located at the longitudinally central portion of one side of the shell, and has the transverse configuration shown in Fig. 3. The interior of this enlarged portion of the shell is accessible through a removable side plate or closure 35, which may contain a normally closed air vent 136.

The entire interior surface of all of the metal walls of shell 13 may be covered with suitable heat insulating material, preferably including two layers of heat reflective aluminum 36, between which there is provided an intermediate layer of fiber glass 37 (see Fig. 4). This insulation causes the shell walls to be very effective heat insulators, to prevent escape of heat from the air space about tanks 11 and 12 to the atmosphere (or to prevent reverse transmission of heat in some situations), while the walls of the tanks 11 and 12 themselves are much more readily conductive to heat. The two tanks 11 and 12 are mounted above bottom wall 26 of the shell, and in a manner such that air may flow transversely across the undersides of the tanks within the shell, this mounting typically being effected by a number of mounting members or channels 38 rigidly welded to the shell bottom and to the tanks. Channels 38 may be relatively short, to provide spaces 39 therebetween (see Fig. 2), through which air may flow transversely beneath the two tanks.

Blower 22 is driven by a motor 40, and acts to take suction at 41 and discharge through a discharge conduit 42 having an open end 43. Conduit 42 directs the discharged air generally horizontally across the upper sides of tanks 11 and 12 at opposite axial sides of the location of transverse wall 21, and the air then flows annularly entirely about the two tanks along the annular space between the tanks and shell wall, ultimately to pass through heating coils 23 to again be taken by the suction side of the blower for repeated discharge at 43. In order to require such flow of the air entirely about tanks 11 and 12, there may be provided a baffle or plate 44 extending vertically between the upper sides of tanks 11 and 12 and the upper wall of the shell, and extending the entire distance from one end of the shell to the other, to close off the flow of air between opposite sides of baffle 44 except at the location of blower discharge conduit 42 which extends through an opening in the baffle. Thus, the major portion of the air discharged by the blower, and normally substantially all of that air, flows entirely about the tanks 11 and 12 along an annular path centered about the axis 20 of the tanks, before again being taken by the blower for further circulation. This arrangement results in the maintenance of a very uniform temperature for all of the fats contained within the two tanks 11 and 12, that temperature being controlled by automatic regulation of heater coils 23 by means of a thermostatically responsive element 45 subjected to the temperature of the air within the space between the shell and the walls of tanks 11 and 12.

The space in the tanks 11 and 12 and above the contained fats is preferably filled with a gas which is inert with respect to the fats, and which in particular does not contain any substantial amount of oxygen, since oxygen tends to react with the fats and make them rancid. The most desirable gas for this purpose of nitrogen, which may be supplied by a pair of side by side supply cylinders 46 (only one visible in Fig. 2) located at a front end of shell 13. The nitrogen from cylinders 46 may pass through a suitable pressure regulating and control valve unit 47, including an automatic pressure regulator valve from which the nitrogen discharges at a reduced and automatically controlled pressure (say about 2 to 5 pounds per square inch above atmospheric pressure) through lines 48 and into the upper portions of tanks 11 and 12. A pair of check valves 49 in lines 48 prevent reverse flow of the nitrogen from the tank back toward the valve unit 48. When fats are being filled into one of the tanks 11 or 12, the nitrogen containing space is of course reduced in size, with a resultant increase in pressure of the nitrogen, and to relieve this pressure there are provided a pair of relief valves 50 connected into the upper ends of the two tanks and adapted to discharge nitrogen from the tanks to the atmosphere to prevent an increase in gas pressure in the tanks above a predetermined value (say 8 to 10 pounds per square inch above atmospheric pressure). A pair of additional valves 150 connected onto the upper ends of the two tanks may be provided for allowing air to enter the tanks from the atmosphere if the nitrogen supply becomes depleted. These valves 150 may be conventional check valves adapted to admit air into the tanks when the pressure in the tanks falls below atmospheric pressure, but at all times preventing reverse or outward flow of nitrogen or air from the tanks. The nitrogen pressure reduction valve 47 of course always maintains a super atmospheric pressure in the tanks as long as nitrogen is available. As the fats are subsequently withdrawn from the tanks, additional nitrogen of course flows into the tanks from the supply cylinders 46 and through regulator valve unit 47 and check valves 49. The quantity of fats in the two tanks may be individually indicated by separate volume indicating gauges 51, which are positioned for easy viewing by an operator, but are actuatable remotely by floats 52 positioned in the tanks and connected to the indicating apparatus by elongated flexible tapes 53 movably extending through conduit 54.

Beneath the location of nitrogen supply tanks 46, there is provided across the forward end of shell 13, a transversely extending closed compartment 55, which may be of rectangular configuration, and which is rigidly attached to the shell. The back side of compartment 55 may be formed by the vertically extending end wall 28 of the lower portion of the shell. At its front side (see Fig. 5), compartment 55 is closed by a pair of separately openable side by side upwardly swinging doors 56 hinged at 57, so that when these doors are opened, the apparatus within compartment 55 is accessible for operation or repair.

Compartment 55 contains the pumps and valves which are utilized for filling and emptying the two tanks 11 and 12. Behind one of the doors 56, there is provided in compartment 55 a tank filling pump 58, driven by a motor 59 also in the compartment, and acting to take suction through a line 60 from a valve fitting 61 at the outside of the compartment and shell, which fitting is connectible to a filling line 62 from a truck which may deliver the fats to the apparatus. When motor 59 is in operation, pump 58 acts to discharge fats selectively to either of the tanks 11 or 12 through a three-way valve 63 and a pair of lines 64 and 65 going to the tanks. Valve 63 is a conventional rotary three-way valve actuatable by a handle 66 to either of two positions, for feeding fats from pump 58 to either of the two tanks 11 or 12 selectively.

Behind the second of the doors 56, compartment 55 contains a second pump 67 driven by a motor 68 and acting to take suction selectively from either of the two tanks 11 and 12 through a pair of lines 69 and 70 and a rotary three-way valve 71 adapted to place either of the tanks individually in communication with the suction side of the pump. Pump 67 discharges through a line 72 leading to the exterior of compartment 55 and ultimately to a tempering tank 73 which will be discussed in greater detail at a later point. Some of the fats discharged from pump 67 are bypassed through a line 74 back to the same tank from which the pump is taking suction, to set up a circulation of the fats in the tank and thus effect a stirring action. More particularly, bypass line 74 leads to a rotary three-way valve 75 which will selectively feed the by-passed fats to either of the tanks 11 or 12 through a pair of lines 76 and 77. The return valve 75 is connected to suction valve 71 for actuation therewith, so that return valve 75 automatically returns fats to the same tank from which suction valve 71 is withdrawing fats. For this purpose, valve 75 may be positioned above valve 71 and in axial alinement therewith, so that the handles 78 of the two valves swing about a common vertical axis 79, and handles 78 may then be mechanically innerconnected by a connection indicated at 80 so that these handles will swing only in unison. The two return lines 76 and 77 should of course introduce the returned fats into tanks 11 and 12 at locations spaced substantial distances away from the points at which suction lines 69 and 70 withdraw fats from the tanks, so that an effective stirring action is attained.

The air within the entire closed compartment 55 is heated by a suitable heater represented at 81, which heater is thermostatically controlled in accordance with variations in the temperature of one of the fat conducting lines within compartment 55. Preferably, this thermostatic control is effected by a thermostatic unit 82 including a heat conductive strap 83 disposed about and directly contacting line 72 within compartment 55, this strap 83 serving to reliably transmit the temperature of line 72 and its contained fats to the temperature responsive element in unit 82, which then regulates heater 81 for maintaining a desired temperature of line 72.

The entire fat storing unit 10 may be located at the outside of a bakery or other building, and may be utilized for supplying fats to other apparatus located within the building. In Fig. 1, such a building is represented diagrammatically by the broken lines 84. The fats discharged from unit 10 first flow through a portion of line 72 which is located at the outside of building 84 and is jacketed by heat insulation 172. After line 72 enters the building, it may no longer be jacketed. Along substantially its entire extent, line 72 is preferably heated to assure against solidification or hardening of the fats when in this line. For this purpose, line 72 may contain two parallel electrically resistive elongated wires or heater elements 85, which are suitably insulated by insulation 185, and housed within a corrosion resistant flexible tube 86, (typically formed of aluminum), and which extend longitudinally within and in spaced relation to pipe 72. Wires 85 are connected together at first ends 186, and are connected to opposite sides of an A. C. power source 187 at their second ends, so that electric current flows in opposite directions along the two wires. An electrical current is passed through heater element 82 continuously, to internally heat conduit 72 and the contained fats. Also, the interconnection of the two wires 85 to carry oppositely directed currents causes the magnetic fields associated with the two wires to cancel out to thus prevent any adverse effect on the fats by the magnetic fields. In some instances, tube 86 may be eliminated, and the insulation 185 may be formed of a resinous plastic or other material (such as vinyl chloride) which will not react with or affect the fats. There may be a branch 72a of line 72 leading to a second tempering tank, and if so this line 72a may contain a heater unit 200, including a pair of resistor wires similar to and connected in parallel with wires 85, and a protective tube similar to tube 86.

The fats flowing through line 72 may pass to one or more tempering tanks 73, within which the temperature of the fats is gradually reduced to a predetermined value. For instance, the temperature in tanks 11 and 12 may be about 110°–118° F., while the temperature in which the fats are ultimately reduced in tempering tank 73 may be about 96° F. to 100° F. Fats are automatically fed into the upper end of tempering tank 73 under the control of a float unit 88, which controls the operation of motor 68 to maintain tank 73 substantially full of fats at all times.

Tank 73 may have a cylindrical vertically extending side wall 189 closed at its upper end by a cover 89 (see Fig. 6). The fats are withdrawn from the center of the preferably downwardly converging or downwardly concave bottom wall 90 of tank 73 through a center discharge line 91. As the fats advance downwardly from the upper end of tank 73 to the lower end, the fat temperature gradually reduces to the desired value, the drop in temperature preferably being aided by a cooling jacket 173 surrounding the side wall of the tank from its bottom to a point near the top of the tank. Cooling water or other fluid at a temperature lower than the fat temperature may be continuously circulated through this jacket from an inlet 174 to an outlet 175. In order to assure that the fats will be sufficiently liquid at the discharge location to flow readily through line 91, there is provided across the underside of bottom wall 90, a heating unit or jacket 92, which may be a steam or hot water jacket, or in some instances may be an electrical heater unit. This heater is thermostatically controlled in accordance with the temperature of the fats near the location of bottom wall 90, as by a valve 93 controlling the supply of heating fluid to jacket 92 and itself thermostatically operated by a temperature responsive element 94 connected into the lower portion of tempering tank 73. The temperature of fluid in jacket 92 is of course higher than the temperature of fluid in jacket 173.

The fats are withdrawn from tempering tank 73 by means of a metering system including a metering pump 95 and an electrically controlled unit 96 for the pump. These metering parts 95 and 96 will not be described in detail in this application, but may be of the type disclosed in my Patent No. 2,550,942, issued May 1, 1951, entitled "Metering and Dispensing Control System." For present purposes it may be stated merely that control unit 96 includes an actuating push button 97, which when pressed inwardly causes unit 96 to commence a cycle of operations, during which cycle pump 95 is driven for a predetermined accurately controlled period to discharge a measured quantity of fats through a line 98 to a dough mixing unit 99. This mixing unit 99 is a conventional type of dough mixer used in bakeries, into which the dry ingredients are fed through a feed chute 100 to be mixed with the fats. Unit 99 then acts to mix these ingredients including the fats, and, after mixing, the dough is withdrawn from the forward side of mixer 99 through an opening which is normally closed by an upwardly sliding door 101.

In order to prevent an operator from lifting door 101 and removing the dough from the mixer without having first added the fats to the other ingredients, I provide an automatic control preventing opening of door 101 unless the fat feeding unit 96 has been actuated. This control system is represented schematically in Fig. 1, and may include a horizontally moving lock pin 102 adapted to move laterally into a mating recess or opening formed in the side of door 101, and acting when received in that recess to positively retain the door against upward opening movement. Pin 102 is retractible to the right as seen in Fig. 1, and to an inactive position permitting upward opening movement of the door, by energization of a control solenoid 103, energized by a suitable power source represented at 104. The circuit to solenoid 103 is adapted to be closed by a switch 105, which is actuated automatically by a control represented at 106 when push button 97 of unit 96 is pressed inwardly to feed fats to the mixer. Thus, unless an operator has pressed push button 97 inwardly to add the fats to the other ingredients, door 101 cannot be lifted. Solenoid 103, in addition to actuating pin 102, may also serve when energized to close a conventional holding contact 107 for maintaining the solenoid energized even after push button 97 is released. The circuit to solenoid 103 may subsequently be automatically opened again, to release the solenoid, by automatic opening of a normally closed switch 105a when door 101 is lifted and acts to engage and temporarily open that switch. Thus, when the door is lifted into engagement with switch 105a, the solenoid is de-energized to permit the pin 102 (which is spring urged to the left) to bear laterally against the edge of door 101, and to ultimately return into the locking recess in the door when the door is again closed after the dough has been removed.

In placing the apparatus in use, tanks 11 and 12 are first filled by pump 58, and valves 71 and 75 are then set to withdraw fats from one of the tanks 11 or 12, and to recirculate some of the fats back through valve 75 to the same tank for stirring purposes. Motor 68 is automatically controlled by float control unit 88 to withdraw fats from the tank 11 or 12 as necessary to maintain tempering tank 73 substantially full, the fats then being cooled in the tempering tank and being fed as necessary by pump 95 to the mixer 99. While one of the tanks 11 or 12 is set for discharge, fats may be filled into the other tank, and in view of this immediate availability of a second filled supply tank for use when necessary, the tank in use may in each case be drained completely before shifting suction to the other tank, to thus prevent the necessity for mixing of any retained fats with other fats which will later be filled into the tank. This feature is of considerable importance, since the mixture of a small amount of older fats with a new supply of fats may adversely affect the condition of the latter.

Fats filled into the tanks 11 and 12 are normally at a proper temperature when delivered from the truck, and the present storage unit 10 allows for maintenance of that proper temperature without substantial loss of heat to the atmosphere. The circulating air within the space between shell 13 and tanks 11 and 12 maintains the fat temperature uniform throughout, and thus assures proper feeding of the fats from the tanks at exactly the desired temperature. The insulation along the inside of shell 13 holds substantially all of the heat within the supply unit 10. Also, the nitrogen supply system prevents contact of any of the fats with oxygen while in the tanks, so that the fats do not become rancid.

In some cases, it may be desirable to take in some atmospheric air into the air circulation space within the shell. This is permissible by opening of air vent 36 to a desired condition. Also, in some insulations, it may be desirable to cool the circulating air below atmospheric temperature, in which case the temperature control unit 23 may comprise a refrigerating coil, through which the circulating air flows, and which is thermostatically controlled by unit 45.

I claim:

1. A unit for holding a liquid at a controlled temperature comprising a tank for containing a body of said liquid, means through which said liquid may be filled into and dispensed from the tank, an outer shell disposed about the tank and spaced therefrom at its top, bottom and sides to define an enclosed air circulation space between the tank and shell within which air flowing along an endless path may circulate about the tank, said path extending across the top of said tank, then downwardly at one side of the tank and across its underside, and then upwardly at the opposite side of the tank for recirculation across its top, a blower operable to produce a circulation of air in said space following said endless path about the tank, a heater disposed along said air path at a location to heat the air flowing along said path to maintain the tank contents at a predetermined temperature, and a thermostat responsive to variations in temperature in said shell and controlling said heater, said shell having a lower portion forming a liquid tight safety basin of a size to hold the entire contents of said tank in the event of leakage therefrom.

2. A unit as recited in claim 1, including heat insulation extending along the inner side of said outer shell for resisting heat loss through the shell to the atmosphere, the walls of said tank being more heat conductive than the walls of said shell as insulated by said heat insulation.

3. A unit as recited in claim 1, including a partition extending between said tank and the shell wall, and disposed across said air circulation path, said blower having a suction opening at one side of said partition and a discharge opening at the other side thereof.

4. A unit as recited in claim 1, including means for supplying to said tank above said liquid an atmosphere of a gas which is inert with respect to said liquid.

5. A unit as recited in claim 1, in which there are two of said tanks within said shell and spaced at all sides therefrom, said liquid tight safety basin being adapted to hold the entire contents of both of said tanks in the event of leakage therefrom.

6. A unit as recited in claim 1, in which said tank has a generally tubular wall forming the top and bottom and two opposite sides of the tank and closed at opposite ends by a pair of end walls, said tubular wall following said air circulation path as it extends about the tank, and said tubular wall being curved progressively in the direction of said path and substantially continuously about substantially the entire periphery of the tank to provide a smoothly curving inner wall of the path.

7. A unit as recited in claim 1, in which there are two of said tanks in the shell, said two tanks being essentially cylindrical with their axes generally horizontal and essentially aligned, the discharge of said blower being directed to blow air essentially circumferentially about said tanks and about essentially their common horiozntal axis, said shell having a lower essentially rectangular portion forming said liquid tight safety basin and adapted to contain all of the contents of both tanks in case of leakage therefrom.

8. A unit as recited in claim 1, including means attached to said shell forming a compartment isolated from said space in the shell and accessible from the outside of the shell, said tank filling and dispensing means including pump, valve and conduit means in said compartment for filling liquid into and dispensing it from said tank.

9. A unit as recited in claim 1, including heat insulation extending along the inner side of said outer shell for resisting heat loss through the shell to the atmosphere, and means for supplying to said tank above said liquid an atmosphere of a gas which is inert with respect to said liquid.

10. A unit as recited in claim 9, in which said tank has a generally tubular wall forming the top and bottom and two opposite sides of the tank and closed at opposite ends by a pair of end walls, said tubular wall following said air circulation path as it extends about the tank, and said tubular wall being curved progressively in the direction of said path and substantially continuously about substantially the entire periphery of the tank to provide a smoothly curving inner wall of the path, said unit including baffle means positioned between said tank and shell and across said air path and preventing recirculation of air from the blower discharge directly back to the blower suction to thereby require flow of the air along said endless path.

11. A unit as recited in claim 10, in which there are two of said tanks in the shell and spaced at all sides therefrom, said two tanks being essentially cylindrical with their axes generally horizontal and essentially aligned, the discharge of said blower being directed to blow air essentially circumferentially about said tanks and about essentially their common horizontal axis, said shell having a lower essentially rectangular portion forming said liquid tight safety basin and adapted to contain all of the contents of both tanks in case of leakage therefrom, said shell having an upper essentially semi-cylindrical portion generally concentric with and spaced from said cylindrical tanks.

References Cited in the file of this patent

UNITED STATES PATENTS

| | | |
|---|---|---|
| 1,562,531 | Watkins | Nov. 24, 1925 |
| 1,863,781 | Wright | June 21, 1932 |
| 2,255,986 | Rapisarda | Sept. 16, 1941 |
| 2,327,733 | Moore | Aug. 24, 1943 |
| 2,482,256 | Freed | Sept. 20, 1949 |
| 2,555,250 | Schroeder | May 29, 1951 |
| 2,576,575 | Collins | Nov. 27, 1951 |
| 2,645,461 | Brown et al. | July 14, 1953 |

OTHER REFERENCES

"How Nitrogen Protects the Quality of Foods," Food Industries, Sept. 1949, page 37.